United States Patent
Coen

(10) Patent No.: US 10,142,590 B2
(45) Date of Patent: Nov. 27, 2018

(54) DEVICES, SYSTEM AND METHOD FOR SHARING A PRESENTATION

(71) Applicant: BARCO NV, Kortrijk (BE)

(72) Inventor: Guy Coen, Aalst (BE)

(73) Assignee: BARCO NV, Kortrijk (BE)

( * ) Notice: Subject to any disclaimer, the term of this patent is extended or adjusted under 35 U.S.C. 154(b) by 0 days.

(21) Appl. No.: 15/261,155

(22) Filed: Sep. 9, 2016

(65) Prior Publication Data

US 2017/0078615 A1    Mar. 16, 2017

(30) Foreign Application Priority Data

Sep. 11, 2015  (EP) ..................................... 15184784

(51) Int. Cl.
| | |
|---|---|
| H04N 7/14 | (2006.01) |
| G06Q 10/10 | (2012.01) |
| H04N 7/15 | (2006.01) |
| G06F 3/048 | (2013.01) |
| H04L 29/06 | (2006.01) |
| H04W 4/06 | (2009.01) |
| H04M 3/56 | (2006.01) |
| H04M 7/00 | (2006.01) |

(52) U.S. Cl.
CPC ............. *H04N 7/147* (2013.01); *G06F 3/048* (2013.01); *G06Q 10/10* (2013.01); *G06Q 10/103* (2013.01); *H04L 65/4015* (2013.01); *H04L 65/4076* (2013.01); *H04M 3/567* (2013.01); *H04N 7/15* (2013.01); *H04W 4/06* (2013.01); *H04M 7/0027* (2013.01)

(58) Field of Classification Search
CPC .......... H04N 7/147; H04N 7/15; H04N 7/142; H04N 7/152; H04N 21/4223; H04N 7/155; H04N 7/157

USPC ................................ 348/14.01, 14.08, 14.09
See application file for complete search history.

(56) References Cited

U.S. PATENT DOCUMENTS

| | | | |
|---|---|---|---|
| 2004/0207724 A1* | 10/2004 | Crouch ............. | H04L 29/06027 348/14.09 |
| 2005/0114521 A1 | 5/2005 | Lee et al. | |
| 2011/0267419 A1* | 11/2011 | Quinn ...................... | H04N 7/15 348/14.08 |
| 2014/0063174 A1* | 3/2014 | Junuzovic ............ | G06Q 10/101 348/14.02 |
| 2014/0074855 A1* | 3/2014 | Zhao ................... | G06F 17/3002 707/746 |
| 2014/0198173 A1* | 7/2014 | Willig ...................... | H04N 7/15 348/14.03 |

(Continued)

FOREIGN PATENT DOCUMENTS

WO    2012/088230    6/2012

OTHER PUBLICATIONS

Extended Search Report dated Feb. 5, 2016 in counterpart European Patent Application No. 15184784.5.

*Primary Examiner* — Quoc D Tran

(74) *Attorney, Agent, or Firm* — Nixon & Vanderhye, P.C.

(57) ABSTRACT

The present invention relates to methods and devices for sharing a presentation, allowing the presenter to capture and archive key elements of a meeting (KEMs) such as image frames for storage and later retrieval. The capture may be done via a device connected to one of a plurality of screens. The invention also allows the presentation to be followed on a personal device such as a smart phone, which can also access archived KEMs.

18 Claims, 5 Drawing Sheets

(56) References Cited

U.S. PATENT DOCUMENTS

2015/0092009 A1* 4/2015 DeLuca .................. H04N 7/15
　　　　　　　　　　　　　　　　　348/14.08
2015/0373063 A1* 12/2015 Vashishtha .......... H04L 65/1089
　　　　　　　　　　　　　　　　　348/14.07

* cited by examiner

DEVICES, SYSTEM AND METHOD FOR SHARING A PRESENTATION

This application claims priority to EP Patent Application No. 15184784.5 filed on Sep. 11, 2015, the entire content of which is hereby incorporated by reference.

FIELD OF THE INVENTION

The present invention is in the field of sharing a live presentation session for instance in a meeting room, lecture hall, conference facility. In particular it is in the field of simultaneously sharing the presentation to a number of display devices and a number of personal devices. It also allows storage of key elements of a presentation that can be recalled during the live presentation session, or afterwards.

BACKGROUND TO THE INVENTION

Allowing persons to communicate and share information with each other is one of the fundamental aspects of collaboration, problem solving, negotiation, teaching and education, etc. To assist in communication, there has been an explosion of electronic communication tools.

One classic approach is the lecture or seminar often involving a presentation using presentation software. To a large extent the traditional single person presentation or lecture has been maintained with the audience being in a rather passive mode as far as determining, constructing, augmenting or modifying the information to be presented is concerned.

The AMIDA Final Public Report describes the overall methodology behind the development of meeting support technologies. It reports that numerous studies confirm that meetings dominate the way people work. Namely, according to a study conducted by MCI Worldcom in 2003 a business person participates in 60 meetings per month. People meet in groups for a multitude of reasons. They interact in numerous predictable and unpredictable ways and the results of their interactions are as varied as the people who participate and the projects on which they are collaborating or communicating. Studies of business processes also reveal that approximately 80% of the "workload" associated with a project or process happens in preparation for a meeting. In other words, many people view the "live" meeting as a milestone or deadline by which they can pace and measure their productivity and that of their colleagues. Unfortunately, for many information managers, being in perpetual meetings has reduced their ability to prepare adequately for the next meeting, perpetuating a vicious and negative cycle.

As other business processes, meetings are going digital. Increasingly, people are using computer technology alone and in conjunction with broadband networks to support their meeting objectives prior to and during an actual meeting. For example, e-mail is used to pass around files for people to read prior to a meeting.

Collaborative workspaces in corporate networks and on the Internet offer geographically distributed collaborators a virtual repository for documents related to a project or a meeting. Electronic meeting support systems, such as interactive network-connected white boards and videoconferencing appliances, are available for the benefit of those who share the same room as well as those who are in remote locations. Computer-supported collaborative work technologies, particularly those which capture human verbal and non-verbal communications (audio and video interaction) in addition to text and graphics generated during a meeting, also promise to have a long term impact on how people will prepare for and behave during and following meetings.

However, Marc Al-Hames et al. report in "Audio-Visual Processing in Meetings: Seven Questions and Current AMI Answers", that although large parts of working days are consumed by meetings and conferences, unfortunately a lot of them are neither efficient, nor especially successful. They report a study in which people were asked to select emotion terms that they thought would be frequently experienced in a meeting. The top answer—mentioned from more than two third of the participants—was "boring"; furthermore nearly one third mentioned "annoyed" as a frequently perceived emotion.

Hence, despite the plethora of electronic aids to meetings, fundamental problems in handling meetings have not been solved. In fact organising and conducting meetings in a business context involves a large number of factors. Some of these factors are addressed below.

For example, the lack of efficiency is addressed in the article "Mood indicators on electronic meeting tools" IBM, IP.com number: IPCOM000011711D, Publication Date: Mar. 12, 2003. This article addresses the issue that the lack of direct feedback makes meetings clumsy, inefficient and often unproductive. It proposes a "mood indicator" as well as an "I want to ask a question" indicator which allow the presenter to choose an appropriate moment to pause, change track or field a question. It is argued that interrupting a presenter in full flow can be awkward; however, sometimes it is difficult to get an opportunity to ask a question or make a comment when many different people are trying to make their voices heard. In a similar vein, U.S. Pat. No. 6,966,035 suggests displaying a "murmur frame" for a participant to express a view. To increase user participation, US 2010/0087139 discloses a system for sending a selection to another computer, and US 2006/0095376 discloses a system for secure voting. Commenting, voting or selecting requires that a central authority provides the information that is to be selected or commented or voted on. Hence, these proposals still leave a central figure such as the presenter in a dominating position and the other members of the meeting are largely an audience with limited selection or voting or participation rights.

In the past, the relatively high infrastructure cost of a projector and the installation of the surface to project on lead to a typical setup of one more or less big central screen. In simple setups and small screens, only one source can be shown at the same time. If people need to share more than one source at the same time, a more or less complex and expensive infrastructure is required in the sense of a larger and more expensive projector, a bigger screen real estate and a complex and expensive video composition device to drive the display. Recently, flat displays have become available at low cost with significant advantages: there is no need to foresee a special surface to project on, such displays do not produce as much noise as a projector, the display is visible in more diverse lighting conditions, the installation is much simpler and cheaper and the overall cost can be much lower. This could lead to different meeting setups where multiple flat displays are used to provide more screen real estate in the meeting room. A problem that remains however is how to distribute the visual content to be shown over the available screens in such a way that it is cost effective and not too complex for meeting participants.

Another unsolved issue is how to let people take personal notes in a meeting that also include snapshots of the content shown in the meeting. One used solution is to take snapshots with a smart mobile device with a built-in camera. This only works however if the user is sufficiently close and perpendicular to the screen, nobody is in the line of sight and the ambient lighting conditions are good enough. Even with picture processing applications running on the mobile device that correct color, aspect ratio and lighting effects, the quality of snapshots taken this way is poor.

When a meeting is continued at a different time and/or place, it is often required to take back all the originally used presentation devices of the different participants, despite the fact that in many cases, only a few overview visuals of a previous meeting are needed where people want to refer to. The presenter may also have changed the visual in between the two meetings, in which case it is not possible to refer exactly to the visual shown in a previous meeting. In some situations, it is a legal requirement that presentations, comments and submissions need to be completely reproducible.

SUMMARY OF THE INVENTION

A first aspect of the invention relates to a method (100) (a CD-implementable method) implementable on a computer that is a central device, CD (300), for distributing in a live presentation session, live presentation content generated for display by a primary processing device, PPD (10) to one or more recipient network-enabled processing devices, RNEPD (700), said method comprising the steps:
receiving signals (110) corresponding to the live presentation content generated for display by the PPD (10),
processing the signals (120) received into a network packet data stream,
outputting (130) the network packet data stream for distribution to the one or more RNEPDs.
generating a session ID code (140) for the live presentation session,
generating a CD-presentation session archive linked to the session ID code for the live presentation session on a storage medium connected to the CD,
receiving from a RNEPD a key element of the presentation, KEM, that comprises a captured image frame of the live presentation content (142),
associating the KEM with the session ID code (140),
storing the KEM and associated session ID code in the CD-presentation session archive (144).

The method (100) may further comprises the steps of:
receiving from a RNEPD during the live presentation session input of a "select" command to select one of the KEMs stored in the CD-presentation session archive, and
outputting to RNEPD the selected KEMs.

The method (100) may further comprise the steps of:
assigning one of the RNEPDs that is a personal device, PD, as a central note taker, PD-CNT,
receiving from the PD-CNT during the live presentation session an input of a "select" command to select one of the KEMs stored in the CD-presentation session archive,
outputting to PD-CNT the selected KEM (152),
receiving from the PD-CNT, the KEM updated with official notes (154), and
storing the updated KEM in the CD-presentation session archive (156).

The method (100) may further comprise the steps of:
receiving from a RNEPD that is a personal device, PD, in input of a session ID code (160) of a previous-given presentation session,
retrieving a presentation session archive from the storage medium connected to the CD associated with the inputted session ID code,
receiving an input of a "select" command from the PD to selectively retrieve one or more of the KEMs in the presentation session archive, and
outputting to the PD the retrieved one or more KEMs (162).

A further aspect of the invention relates to a computer or apparatus that is a CD, configured to perform the CD-implementable method (100) as described herein.

A second aspect of the invention relates to a method (500) (a DD-implementable method) implementable on a recipient network-enabled processing device, RNEPD, that is a display device, DD, for displaying in a live presentation session, live presentation content generated for display by a primary processing device, PPD (10), the method comprising the steps:
receiving (510) a network packet data stream corresponding to the live presentation content,
processing (520) the network packet data stream received into image data,
outputting signals (530) corresponding to the image data for rendering of the live presentation content on an image renderer,
receiving an input of a "capture" command to capture (540) and cache (542) on the DD a key element of the presentation, KEM, that comprises a captured image frame of the displayed live presentation content,
receiving an input of a "select" (544) command to selectively retrieve one of the DD-cache KEMs,
outputting for display one of the DD-cached KEMs in place of the live presentation content responsive to the capture or select command, and
receiving an input of a "live" command to revert to outputting the live presentation content.

The method may further comprise the steps of
receiving a session ID code (559) from the CD running the CD-implementable method,
upon receiving the "capture command" further outputting to the CD the DD-cached KEM associated with the session ID code (554),
upon receiving the input of a "select", sending an instruction to the CD to select one of the KEMs stored in the CD-presentation session archive of the live presentation session associated with the session ID code,
receiving from the CD the selected KEM, and
outputting for display, not one of the DD-cached KEMs, but the selected KEM received from the CD in place of the live presentation content responsive to the capture or select command A further aspect is the computer or apparatus that is a DD, configured to perform the DD-implementable method (500) as described herein.

A third aspect of the invention is a method (900) (a PD-implementable method) implementable on a recipient network-enabled processing device, RNEPD, that is a personal device, PD (700), for displaying a live presentation session comprising live presentation content generated for display by a primary processing device, PPD (10), and one or more captured image frames thereof, the method comprising the steps:
receiving (910) a network packet data stream corresponding to the live presentation content,
processing (920) the network packet data stream received into image data, displaying (930) on the PD the live presentation content corresponding to the image data, optionally receiving a session ID code (559) from a CD running the CD-implementable method as described herein, receiving an input of a "capture" (940) command to capture and store (942) on the PD a key element of the presentation, KEM, that comprises the captured image frame of the live presentation content, optionally associating the stored KEM with the session ID code, receiving an input of a "select" (944) command to selectively retrieve one of the PD-stored KEMs of the presentation session, outputting for display the selected PD-stored KEMs in place of the live presentation content responsive to the capture or select command, and receiving an input of a "live" command to revert to displaying the live presentation content.

The method may further comprise the steps of:

receiving from the a PD user interface module during a live presentation session, personal user notes linked to a KEM of the live presentation session, and storing on a storage medium connected to the PD, KEM updated with the personal user notes.

The method may further comprise the steps of:

assigning the PD as a central note taker, PD-CNT, receiving a session ID code from a CD running the CD-implementable method as described herein, receiving input of a "select" command from a PD user interface module during the live presentation session, and sending an instruction to the CD to select one of the KEMs stored in the CD-presentation session archive of the live presentation session associated with the session ID code, receiving from the CD the selected KEM, outputting for display the selected KEM received from the CD in place of the live presentation responsive to the select command, and receiving an input of official notes linked to KEM from a PD user interface module outputting to the CD, the KEM updated with official notes.

The method may further comprise the steps of:

receiving from a PD user interface module, an input of a session ID code of a previously-given presentation session stored in a CD-presentation session archive on a storage medium connected to the CD, receiving from the CD, one or more KEMs from the presentation session archive associated with the inputted session ID code from the storage medium connected to the CD, outputting for display by the PD the received one or more KEMs, and optionally receiving from the PD user interface module an input of personal notes linked to the KEM, and storing on a storage medium connected to the PD the KEM and associated personal notes.

The method may further comprise the steps of:

receiving from a PD user interface module, an input of a session ID code or a user session name of a previously-given presentation session stored in a PD-presentation session archive on a storage medium connected to the PD, retrieving from the PD, one or more KEMs from the presentation session archive associated with the inputted session ID code or a user session name from the storage medium connected to the PD, outputting for display by the PD the one or more KEMs retrieved, and optionally receiving from the PD user interface module an input of personal notes linked to the KEM, and storing on a storage medium connected to the PD the KEM and associated personal notes.

The method may further comprise the steps of synchronising one or more stored KEMs with a cloud-based notes management service such as Evernote or One Note.

A further aspect is a computer program, or computer program product, or data stream which is representative of the compute program, having instructions which when executed by a computing device or system cause the computing device or system to perform the PD-implementable method as described herein.

FIGURE LEGENDS

DETAILED DESCRIPTION OF INVENTION

Figure 1:
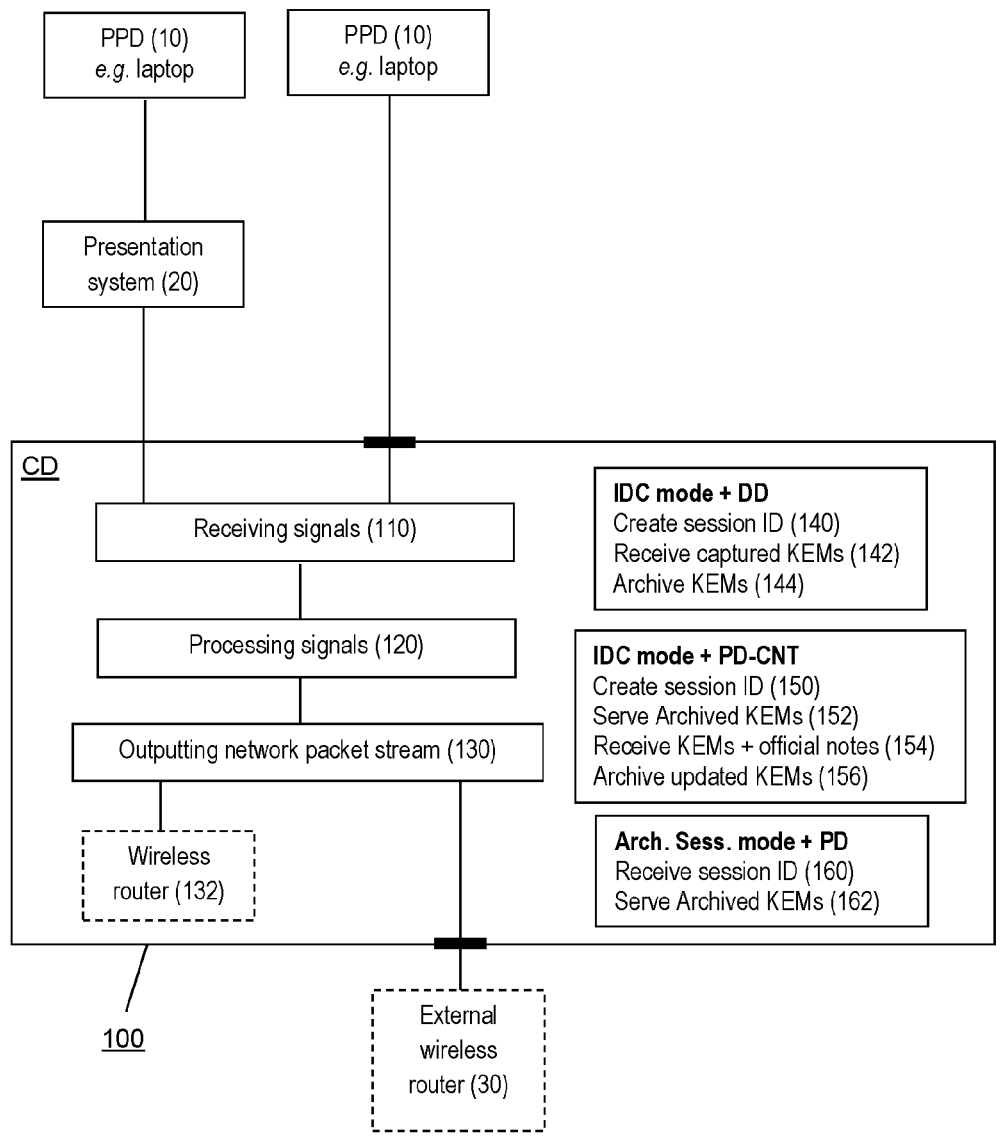
FIG. 1 is an example of a method implementable by a central device, CD, of the invention.

Before the present devices, methods and systems of the invention are described, it is to be understood that this invention is not limited to particular devices, method and system or combinations described, since such devices, methods and systems and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

References to a computing unit can encompass any kind of logic or analog circuitry, integrated to any degree, and not limited to general purpose processors, digital signal processors, application specific integrated circuit (ASIC), field programmable gate array (FPGA), discrete components or transistor logic gates and so on. References to software can encompass any type of programs in any language executable directly or indirectly by a processor.

The present invention offers devices, methods and systems that allow content of a presentation to be distributed across one or more screens, without adding complexity for the user, installer or facility manager, and without adding a high cost to the overall solution. It further provides a possibility to centrally store the key elements of a meeting, KEMs, (e.g. images, notes (text and annotations)) in a meeting that are considered to be important for later reference or as evidence of the meeting and to easily make these visuals available at a different location and/or a later point in time. It may allow meeting participants to easily take personal notes with their personal devices, including images of the live presentation presented in the meeting irrespective of the distance from the screen, free line of sight, or ambient lighting conditions. These capabilities are offered in such a way that they are very easy to use, the system is very easy to install and maintain and are well integrated into ways of working and tools that people are already using.

A first aspect of the invention is a method for implementing on a computer that is a "Central Device", CD, which CD is typically placed in the centre of the meeting room or near the presenter in a seminar. This CD-implementable method captures the content from a primary processing device, PPD, e.g. the presenter's laptop via the physical video output of that presentation device or via a wired or wireless point-to-point network connection and makes it available as a stream on a network. The stream can be received by one or more recipient network-enabled processing devices, RNEPDs. The CD is able to archive one or more key elements of a meeting (KEM), and send them on request to a RNEPD. A KEM comprises an image captured from a live presentation content and optionally notes that may be text and or annotations.

A second aspect of the invention is a method for implementing on a computer that is a "Display Device", DD, connectable to a participating display. This DD-implementable method receives the stream, in particular from the CD and makes it visible on a display device connected to a video output. The DD running the method is a type of RNEPD.

A third aspect of the invention is a method for implementing on a computer that is a "personal device" (e.g. a smart phone, tablet or laptop), PD, of a user in the meeting or seminar, for receiving the stream and displaying it on the screen of the PD. The method provides an interface to allow capture of live presentation images and storage on a medium linked to the PD, note taking (personal or central), retrieval of archives notes, and synchronisation with a cloud-based note taking service such as Evernote or One Note. The PD running the method is a type of RNEPD.

The CD distributes a presentation stream using a network stream. Other network links may be in place between a CD and a RNEPD for example, for announcement of available a stream, for communication of security information, for remote control in case CD acts as remote control for single external DD, web-server/client communication for exchange of KEM's and the like.

A first aspect of the invention is a method (known herein as a "CD-implementable method") for implementing on a computing device that is a central device, CD, for distributing live presentation content to one or more recipient network-enabled processing devices, RNEPDs. There is preferably more than one RNEPD. The live presentation content is generated for display by a primary processing device, PPD, (e.g. laptop). Typically the live presentation content is generated by presentation software such as Powerpoint; it may be generated in a primary or secondary display by the PPD.

A "RNEPD" is a device configured to receive the presentation for display. A RNEPD may be a personal device, PD, such as a smart phone, tablet, notebook, laptop, ultrabook, and the like. A RNEPD may be a display device, DD, described later below.

The CD-implementable method may operate in a "live presentation mode" which refers to operations performed during a live presentation, in particular during streaming of the live presentation content. The CD-implementable method may operate in an "archive session mode" which refers to operations performed in accessing a stored archive session and outside of a live presentation mode. It is appreciate the CD may be configured to perform both methods simultaneously, for instance, allow a user to give live presentation content and at the same time allow another user to access a previously archived session.

The CD-implementable method may operate in an "ad hoc mode" which is very simple but does not allow for later reference, or in an "IDC mode" (identification code mode) which is slightly more complex but offers additional capabilities as explained later. Both "ad hoc mode" and "IDC mode" are options available in the live presentation mode.

The CD may further operate in a "public mode", in which case the stream can be viewed by any RNEPD with access to the network of the CD, or in a "secure mode", in which case the stream can only be viewed an RNEPD by using a correct security code generated by and shown on the CD. The "ad hoc mode" may operate in public mode. The IDC mode may operate in secure mode.

In live presentation mode, the CD-implementable method comprises the steps:
a. receiving signals corresponding to the live presentation content generated for display by the PPD,
b. processing the signals received into a network packet data stream, and
c. outputting the network packet data stream to the one or more RNEPDs.

The "signals" received by the CD-implementable method may be those outputted directly by the PPD for instance, video signals from a VGA, S-video, DVI or HDMI connection. The signals received by the CD-implementable method may be those outputted by an office presentation system to which the PPD is cable or wirelessly connected. The CD may comprise a video input connector for connection to a video output (analogue or digital) of the PPD. The CD may be configured to receive the live presentation content from the PPD via a (wireless or wired) network connection. The CD may be configured to receive the live presentation content from the PPD via a meeting room presentation system. The CD may be configured to receive the live presentation content from the PPD via a capture device connected to the PPD USB port. The CD may comprise a video-capture component to capture video signals outputted directly by the PPD. It may automatically adapt to the format of the video offered to the video-capture component by the PPD.

The CD-implementable method processes the signals received. It converts the signals into a network packet data stream—also called a "stream" or "media stream". The stream may be any image stream that can be distributed across a network, which may be wireless or cabled. It encompasses known and future stream formats and protocols. In the case where there is a small number of RNEPDs (e.g. 1, 2 or 3) the stream may be a unicast IP network packet data stream. The network packet data stream is a preferentially a multicast IP network packet data stream, because that allows to scale up to a large number of users and devices. IP multicasting is well known in the art; it allows scalable communication of data over an IP infrastructure in a network that can be received by many devices. The CD typically sends the data only once.

The MBONE project provides general guidance for multi-casting on IP networks which describes an architecture for multi-casting multimedia traffic on the IPv4 internet at large. The IPv6 standard known in the art is extended towards a more fine-grained traffic shaping for multi-casting. Management protocols, mostly "zero configuration" such as mDNS, Bonjour/Avahi may be employed or adapted.

CD-implementable method may further use video encoding to encode (and thereby also compresses) the video to a more manageable size. The encoding may be performed using a standard format such as H.264 (or MPEG-4 Part 10, Advanced Video Coding (MPEG-4 AVC)), and optimised for multi-casting over an unreliable packet network. There are a number of know proprietary codecs, some license-free open source codecs, but the most commonly used are standardized by the MPEG alliance, which collects license fees through MPEGLA (http://www.mpegla.com).]

CD-implementable method may further use a video transport preparation component configured to prepare the content to be multi-casted over an unreliable network such as to be as robust as possible to transmission problems. One element in this preparation is the addition of some redundancy such as forward error correction (FEC) packets such that packets can be recovered in case of moderate packet loss.

The CD-implementable method may further comprise a step of encrypting the image data prior to distributing (e.g. by multicasting or unicasting). The CD-implementable method may further comprise a step encrypting and decrypting image frames in the CD-presentation session archive. The CD-implementable method may receive a (user) security code to enable encryption and decryption. Encryption and decryption may use any algorithm, for instance, public or symmetric key encryption.

The CD-implementable method outputs the network packet data stream for distribution to the one or more RNEPDs, for instance by unicasting or multicasting. The network packet data stream may be distributed wirelessly or using wired connection. The CD may comprise a wireless router configured to wirelessly stream the network packet data stream; it is configured for compatibility for all types of clients. The CD may alternatively or in addition be configured for connection to an external wireless router or infrastructure configured to wirelessly stream the network packet data stream. The CD typically comprises a network card configured to send network packet data stream wirelessly or over a cabled connection. A meeting or control room may be provided with the necessary infrastructure for connection to the CD.

The CD-implementable method may further comprise providing a management interface that provides access to the CD configuration data, such that it can be configured and managed using an interface such as HTTP or SNMP.

The CD-implementable method may further comprise a providing a network monitoring function to monitor network conditions and provides appropriate feedback to the other modules to take appropriate measures: e.g. capture at lower resolution or lower frame rates, for instance, to encode to lower quality with lower bandwidth requirements, or for instance to group video frames into smaller or larger packets, or for instance to switch to broader, narrower or different channels, or for instance to limit the number or type of additionally allowed receiving devices.

The CD preferably further comprises a CD-user interface module configured to receive a user-input to the CD-implementable method. By user, it is meant the presenter of the presentation. Typically, the CD-user interface module comprises an input device such as one or more mechanical press-switches (buttons), a touch pad, or a touch screen. It may comprise one or more display means such as a screen, the aforementioned touchscreen, and/or light emitting indicators. In a preferred aspect the CD-user interface module comprises a keypad and character (e.g. LCD) display The inventors have found that users optimally interact with the CD when the interface is composed of one or more mechanical press-switches together with a screen such as a character display. Labelled mechanical press-switches lower the cognitive burden for the user.

Ad hoc and IDC mode are both available in the live presentation session. In both ad hoc mode and IDC mode the CD-implemented method provides the basic functionality of streaming the live presentation content. The method may configure the CD to operate in an "ad hoc mode" that it provides instant usage of the CD-implemented method, for instance, streaming with a minimum of input from the user. It is an option that the CD operates in a "IDC mode". The "IDC mode" generates a session ID code, and archives presentation session KEMs associated that code that can be referred to for later retrieval either in live presentation mode or in archive session mode.

The CD-implementable method further comprises the step of storing one or more key element of a meeting (KEM) that comprises a captured image frame of the live presentation content and optionally user notes (text and/or annotations). The storage of KEMs takes place in live session mode.

According, the CD-implementable method further comprises the steps of:
  receiving from an RNEPD a KEM,
  storing on a storage medium connected to the CD the KEM.

The KEM may be received from an RNEPD (e.g. a DD or a PD). The KEM may be stored in a cache on the CD. Cache storage is typically used in ad-hoc mode. Cache storage is temporary storage on the CD that is erased once the presentation session is completed.

The KEM may be stored in an archive on the CD. Archive storage is typically used in IDC mode; in IDC mode a KEM may be associated with session ID code, and stored in a CD presentation session archive that can be later retrieved. It is noted that archived storage refers to any format of storage and may or may not include compression.

The KEM is stored on a storage medium connected to the CD. The storage medium connected to the CD may be present in the CD itself, it may be a networked storage medium, it may be a removable storage medium. Where cached storage is used (ad hoc mode), the storage medium may be solid state memory (e.g. a type of RAM). Where archiving is used (session mode), the storage medium may be a hard-drive. The KEM may be stored in a cloud server. In that case, the retrieval can also be done in another meeting room using a different CD connected to the same cloud server.

The KEM may be received by the CD from the RNEPD via a web-server protocol.

The CD-implementable method may further comprise a step of receiving an input of a "select" command to selectively retrieve one of the CD stored image frames. The "select" command may be an instruction to select forward or backwards through the stored KEMs, one KEM at a time.

The "select" command may be received by an instruction from an RNEPD. The select command may be received by the CD from the RNEPD via a web-server protocol.

When in ad-hoc mode, the CD-implementable method accesses cached KEMs. When in IDC mode, the CD-implementable method accesses archived KEMs.

The selected KEM may be sent to the requesting RNEPD for subsequent display. Accordingly the CD-implementable method may further comprise a step of sending the KEM to the requesting RNEPD. The KEM may be sent using a web-server protocol, such as node.js.

The CD-implementable method may further comprise a step of receiving an input of a "stop" command to stop streaming. The "stop" command may also delete CD-cached KEMs—this is typically the case when the session is an "ad hoc session" in which there is no session ID code has been generated. The "stop" command may also delete any locally cached image frames in RNEPD's.

As mentioned, the CD-implementable method may operate in an IDC mode. The IDC mode the method generates a session ID code for the live presentation session. Any KEM comprising captured image frames of the live presentation content and optionally user notes (text and/or annotations) are associated with the session ID code, and archived in a CD-presentation session archive on the CD. These KEMs that are stored by the CD are sometimes called "shared KEMs" as they can be accessed by any RNEPD, for instance, a DD or a PD (e.g. a PD that is a central note taker, PD-CNT) using the appropriate session ID code and optionally passcode.

The CD-implementable method may further comprise the steps of:
  generating a session ID code for the live presentation session,
  generating a CD-presentation session archive linked to the session ID code for the presentation session,
  associating each CD-stored KEM of the CD-presentation session with the session ID code,
  archiving the CD-stored KEMs and associated session ID code in the CD-presentation session archive on a storage medium connected to the CD.

The session ID code generated by the CD-implementable method may have any formation. For instance, it may include the date of the live-presentation session. It is an aspect that the session ID code is linked to a project code, so that all KEMs related to the same project are stored under than same session ID code.

In IDC mode, the CD-implementable method may allow a resumption at a later point in time of a live presentation session that has previously been stopped and archived. Resumption of the live presentation session is initiated by receiving an input of the session ID code, retrieving the CD-presentation session archive associated with the session ID code, resuming the streaming of the live presentation content, and communicating with the RNEPs. Any new KEMs stored by the CD during the resumed session are associated with the inputted session ID code and added to the CD-presentation session archive. A live presentation session may be stopped and resumed any number of times. It is an aspect that previously archived KEMS associated with the inputted session ID code may not be altered during a subsequent resumed live presentation session.

The CD-implementable method may further comprise the steps of:
  receiving an input of a session ID code referring to a CD-presentation session archive to be resumed, retrieving the PD-presentation session archive associated with the session ID code, and resuming the live presentation session including streaming of live presentation content from a PPD.

The CD-implementable method further allows the CD to interact with a RNEPD that is a PD assigned as central note taker (known herein as a "PD-CNT"). In practice, a PD-CNT may be operated by a secretary taking official notes of a meeting. A PD-CNT is configured to access the CD-archive during a presentation session, selectively retrieve a KEM therein, display on the PD-CNT the retrieved KEM, receive user inputted notes (e.g. text and/or annotations) thereto, and to save the KEM updated with notes in the CD-archive. There is generally only one PD out of all the RNEPDs assigned as PD-CNT during a presentation session. The interaction with a PD-CNT may be only available in "IDC mode". The CD-implementable method may use a web-server protocol to interact with the PD-CNT.

Accordingly, the CD-implementable method further comprises the steps of, during a presentation session in "IDC mode":

recognising a RNEPD that is a PD-CNT, receiving an input of a "select" command from the PD-CNT to selectively retrieve one of the CD archived KEMs associated with the session ID code of the presentation session outputting to the PD-CNT the retrieved KEM, receiving from the PD-CNT an updated KEM further comprising user notes, archiving the updated KEM on a storage medium connected to the CD.

The updated KEM is associated with session ID code of the presentation session in the archive.

In archive session mode, CD-implementable method further allows the CD to interact with a RNEPD that is a PD, allowing the PD to access an archived presentation session. Typically in archive session mode, presentation session was previously completed, and is no longer live. In archive session mode, the CD-implementable method allows a PD to retrieve one or more KEMs of a presentation session archive associated with a session ID code. The PD may then allow a user to browse through the KEM, optionally locally add notes, optionally save the updated KEMs on a storage medium connected to the PD, and optionally synchronise them with a note-taking service such as Evernote or One Note. In archive session mode, the CD-implementable method may not allow the KEM to be changed on the storage medium connected to the CD. The prevention of changes can be useful where it is a legal requirement. In practice, a PD is operated by an attendee of a previous presentation. The CD-implementable method may use a web-server protocol to interact with the PD in archive mode.

Accordingly, the CD-implementable method in an archive session mode further comprises the steps of:

receiving an input of a session ID code from a PD, retrieving a presentation session archive from the storage medium connected to the CD associated with the inputted session ID code, receiving an input of a "select" command from the PD to selectively retrieve one or more of the KEMs in the presentation session archive, and outputting to the PD the retrieved one or more KEMs.

Where the archive is protected with a security passcode, the CD-implementable method may further comprise a step of receiving an input of a security passcode to permit access to the CD-presentation session archive. It may be received from the PD.

As mentioned above, the CD-implementable method may provide a difference in visibility of the live stream on the network—a public mode or a secure mode. The public mode may be available in the ad-hoc mode and not in the IDC mode. The secure mode may be available in the IDC mode and not in the ad hoc mode.

In public mode, any RNEPD with access to the network of the CD can access the live presentation session.

When IDC mode is activated the CD-implementable method may utilise a (e.g. 4-digit) security code to initiate the secure mode. The security code is preferably automatically generated by the CD. The CD-implementable method display the security code on its CD-user interface module. RNEPDs will not access to the live presentation session without the security code. Effectively people outside the room cannot then not view the live presentation content, while people inside the room can view the live presentation session on their PD provided they know the security code (shared by the presenter). DD's can always access the live presentation session see the live stream without security code in IDC/secure mode.

The CD-implemented method may generate a new security code each time a live presentation session is started, or resumed, or an archive session started.

The CD-implemented method may comprise the steps of receiving an input of a "Pause" command, and replacing the stream of the live presentation content with a stream of pause screen. The pause screen is different from the live presentation content, and may be, for instance, the image being shown at the time of receiving the "Pause" command, an overlay of the word "Pause", a stored image, a black, white or coloured background with an overlay of the word "Pause", or the like. The stream of the pause screen is temporary. The CD-implemented method may comprise the steps of receiving an input of a further "Pause" command, and resuming streaming of the live presentation content. The Pause command may be received via the CD-user interface module. In particular, the CD-user interface module may comprise a dedicated mechanical push button labelled as "Pause". Alternatively, the CD-user interface module may comprise a touch screen displaying a dedicated touch button labelled as "Pause".

Accordingly, CD-implementable method may further comprise a step of adapting the network packet data stream to include a security tag to restrict processing of the network packet data stream to RNEPDs that know the security code. The security code is automatically generated by and shown on the CD, for instance, via the CD-user interface module. The security code allows an RNEPD to become enabled i.e. to process the network packet data stream.

An RNEPD (e.g. a PD) may be enabled by manual entry of the security code. An RNEPD (e.g. a DD) may be automatically enabled by a process called "pairing". This is a process done by an administrator of the system in which the DD is configured as a trusted device for the CD.

It is as aspect that the CD further comprises a DD as described herein. Such a combined device allows the CD to acts as a device that can be directly connected to the media rendered (e.g. to a display screen). Such a combined device may also receive commends such as "capture", "select" and "stop" from a user effectively via the DD and interact directly with the CD-presentation session archive connected to the CD.

The first aspect of the invention also provides a computer program or computer program product having instructions which when executed by a computing device or system causes the computing device or system to perform the CD-implementable method as described herein.

The first aspect of the invention also provides a computer readable medium having stored thereon instructions which when executed by a computing device or system causes the computing device or system to perform the CD-implementable method as described herein.

The first aspect of the invention also provides a data stream which is representative of a computer program or computer program product having instructions which when executed by a computing device or system cause the computing device or system to perform the CD-implementable method as described herein.

The computer program or data stream may be available from an "App store" such an iTunes or Google Play.

The first aspect of the invention also provides a computer or apparatus that is a CD configured to perform the CD-implementable method described herein. The CD typically comprises a central processing unit, CPU, connected to a memory and one or more I/O interfaces for connection to, for instance, a CD-user-interface module (e.g. keypad and character LCD display), a network card, and a video capture card. The CD may be a stand-alone device for connection to a display such as a TV or projector. The CD may be a conventional laptop. The CD may be the PPD i.e. the laptop or desktop running the presentation software such as PowerPoint. The CD may be integrated into a presentation system. An example of a CD and software is given in FIGS. 1 to 3.

A second aspect of the invention is a method (known herein as a "DD-implementable method") for implementing on a computing device that is a display device, DD, a type of network-enabled processing device, RNEPD. The DD-implementable method receives via a network packet data stream of the live presentation content generated for display by a primary processing device (PPD, e.g. laptop). The network packet data stream is preferably one stream by the CD. When the DD is referred to herein, it means a DD running the DD-implementable method. The DD processes the network packet data stream, reorders packets, decodes encoded video and outputs image signals to an image renderer. The DD may further communicate with the CD to access archived captured images when the CD is in an IDC mode. The DD is typically an inexpensive processing device (e.g. based on a Raspberry Pi, or an Arduino, or other computing platform) that can be powered from a USB port, such that no external power supply is needed. It may conveniently be powered by the USB port of a television or monitor.

The method for implementation on a computer that is a DD preferably comprises the steps:
receiving a network packet data stream corresponding to the live presentation content,
processing the network packet data stream received into image data, and
outputting signals corresponding to the image data into signals for rendering of the live presentation content on an image renderer.

The DD-implementable method comprises the step of receiving the network packet data stream. The DD may comprise a wireless network receiver configured to wirelessly receive the network packet data stream. The DD may be configured for wireless or cabled connection to an external wireless router or infrastructure carrying the network packet data stream. A meeting or control room may be provided with the necessary infrastructure for connection to the DD. The DD typically comprises a network card configured to receive network packet data stream wirelessly or over a cabled connection.

The DD-implementable method comprises the step of processing the network packet data stream received into image data. In particular, the DD-implementable method processes the packets received over the network. The network packets are assembled. Any errors may be corrected. The effects of transmission errors are minimised by the method. A jitter buffer may be provided to handle jitter and packet reordering and a forward error correction (FEC) handler may be provided to recover packets, for instance, using the redundant FEC packets. The DD-implementable method may also decode any encoded video frames, for instance, that have been encoded using a standard format such as H.264. The DD-implementable method further comprises the step of scaling the image.

The DD-implementable method may further comprise the step of decrypting encrypted image data, which encryption may have been used in case additional security levels are required over and above the security and encryption already offered by the network.

The DD-implementable method comprises the step of outputting signals corresponding to the image data into signals for rendering of the live presentation content on an image renderer. The DD-implementable method converting the image data into signals for rendering on an image renderer and it further outputs the signals. An image renderer may be any type of display device such as a projector, a TV or monitor. The DD may be disposed with a video output connector (e.g. RCA, scart, DVI, HDMI) for connection to the media renderer (e.g. a TV). The DD typically comprises a video display driver for outputting the signals.

The DD preferably further comprises a DD-user interface module configured to receive a user-input for the method. Typically, the DD-user interface module comprises an input device such as one or more mechanic press-switches (buttons), a touch pad, a touch screen. It may comprise one or more display means such as a screen, the aforementioned touchscreen, light emitting indicators.

The DD-implementable method may configure the DD to operate in an "ad hoc mode". The DD preferably operates in "ad hoc" mode when the CD operates in "ad hoc" mode. The "ad hoc" mode as mentioned elsewhere provides instant usage of the CD-implemented method, for instance, streaming and capturing. It is an option that the DD operates in an "IDC mode". The DD preferably operates in "IDC" mode when the CD operates in "IDC" mode. The "IDC mode" described already above, allows access to a CD-presentation session archive. In the "session mode" a session ID code is generated by the CD that can be referred to for later retrieval of archived presentation sessions.

The DD-implementable method may further comprise the step of capturing at least one KEM that comprises an image frame from the live presentation content outputted by the DD and caching them on a storage medium connected to the DD. The step of capturing is in response to a user command.

The DD-implementable method may further comprise the step of receiving an instruction (via the network) to delete DD-cached KEMs.

The storage medium connected to the DD is preferably within the DD itself, however, it may be a networked storage medium, it may be a removable storage medium. Preferably, the storage medium may be a solid state memory (e.g. a type of RAM).

Hence, the DD-implementable method may further comprise the step of receiving an input of a "capture" command to capture and cache on the DD a KEM of the presentation outputted by the DD. The "capture" command may be provided by a user, for instance, it may be received via the DD-user interface module. The "capture" command may be received from the CD. For instance a user may enter a "capture" command on via the CD-user interface module, which command is transmitted to the DD across a network connection. This allows the CD to act as a remote control, for instance, when there is one DD in the system.

In ad-hoc mode, the DD-implementable method may utilise a DD cache not only to capture, but also to retrieve KEMs.

Hence, the DD-implementable method may further comprise the step of receiving an input of a "select" command to selectively retrieve one of the DD-cached KEMs. The select command may be an instruction to select forward or backwards through the cache one KEM at a time. The "select" command may be provided by a user, for instance, it may be received via the DD-user interface module. The "select" command may be received from the CD. For instance a user may enter a "select" command on via the CD-user interface module, which command is transmitted to the DD across a network connection. This allows the CD to act as a remote control, for instance, when there is one DD in the system.

The DD-implementable method may further comprise the step of outputting one of the DD-cached KEMs in place of the presentation session. After KEM is captured by the capture command, for instance, the DD-implementable method may output the captured (cached) KEM in place of the presentation session. After an instruction of a select command is received, the DD-implementable method may output the DD-cached KEM in place of the live presentation content. Hence, the DD-implementable method may further comprise the step of outputting one of the DD-cached KEM in place of the live presentation content responsive to the store or select command.

The DD-implementable method may further comprise the step of receiving an input of a "live" command, to revert to outputting the streamed live presentation content. The "live" command may be provided by a user, for instance, it may be received via the DD-user interface module. The "live" command may be received from the CD. For instance a user may enter a "live" command on via the CD-user interface module, which command is transmitted to the DD across a network connection. This allows the CD to act as a remote control, for instance, when there is one DD in the system.

The DD-implementable method may further comprise the step of receiving an input of a "stop" command to stop streaming. The "stop" command may be provided by a user, for instance, it may be received via the DD-user interface module. The "stop" command may be received via the network from the CD. The "stop" command preferably initiates deletion of DD-cached KEMs.

In IDC mode, the DD-implementable method may still utilise a local cache to capture KEMs; in addition, input of a "capture" command may instruct the DD to send for archive storage on the CD a DD-captured KEM of the live presentation content outputted by the DD. The DD-captured KEM may be associated with the session ID code generated by the CD, prior to sending to the CD. Accordingly, the DD-implementable method may further comprise the step of receiving the session ID code corresponding to the live presentation session from the CD.

Further, the DD-implementable method may further comprise the step of receiving an input of a "capture" command and sending the DD-captured KEM of the presentation to the CD. The "capture" command may be provided by a user, for instance, it may be received via the DD-user interface module. The "capture" command may be received from the CD. For instance a user may enter a "capture" command on via the CD-user interface module, which command is transmitted to the DD across a network connection. This allows the CD to act as a remote control, for instance, when there is one DD in the system.

The DD-implementable method may further comprise the step of receiving an input of a "select" command to selectively retrieve from the CD one of the CD-archived KEMs. The select command may be an instruction to select forward or backwards through the CD-archived KEMs one KEM at a time. The "select" command may be provided by a user, for instance, it may be received via the DD-user interface module. The "select" command may be received from the CD. For instance a user may enter a "select" command on via the CD-user interface module, which command is transmitted to the DD across a network connection. This allows the CD to act as a remote control, for instance, when there is one DD in the system.

The DD-implementable method may further comprise the step of outputting one of the selected CD-archived KEMs in place of the live presentation content. After a KEM is captured by the capture command, for instance, the DD-implementable method may output the captured KEM in place of the live presentation content. After an instruction of a "select" command is received, the DD-implementable method may output the CD-archived KEM in place of the live presentation content. Hence, the DD-implementable method may further comprise the step of outputting one of the CD-archived KEMs in place of the live presentation content responsive to the capture or select command.

The DD-implementable method may further comprise the step of receiving an input of a "live" command, to revert to outputting the streamed live presentation content. The "live" command may be provided by a user, for instance, it may be received via the DD-user interface module.

The DD-implementable method may further comprise the step of receiving an input of a "stop" command to stop streaming. The "stop" command may be provided by a user, for instance, it may be received via the DD-user interface module. The "stop" command may be received via the network. The "stop" command may initiate deletion of DD-cached KEMs. The "stop" command may be received from the CD. For instance a user may enter a "stop" command on via the CD-user interface module, which command is transmitted to the DD across a network connection. This allows the CD to act as a remote control, for instance, when there is one DD in the system.

The DD may communicate with the CD to perform commands such as "capture", select" and "stop" across a network connection with the CD. Preferably, the network connection is wireless. The network connection is separate from the network stream.

As mentioned above, CD-implementable method may provide a difference in visibility of the live stream on the network—a public mode or a secure mode. When in public mode, any RNEPD with appropriate software can view the presentation session. For secure mode, an RNEPD that is a DD may be automatically enabled by a process called "pairing". This is a process done by an administrator of the system in which the DD is configured as a trusted device for the CD.

The DD-implementable method may further comprise the step of enabling the method (or DD) to display the live presentation content restricted to a group of enabled RNEPDs. The DD-implementable method may further comprise the step of recognising a security tag in the network packet data stream that sets the method (or DD) to an enabled state for a live presentation session, and the method processes the network packet data stream. Where the security tag is not recognised, the method (or DD) remains in a non-enabled state and the method does not process the network packet data stream Accordingly, the DD-implementable method may further comprise the steps of extracting a security tag present in the network packet data stream, setting an enabled state (of the DD) when the security tag is recognised, wherein processing of the network packet data stream is permitted, and set a non-enabled state (of the DD) when the security tag is not recognised, wherein processing of the network packet data stream is prohibited.

The DD-implementable method may further comprise the step of decrypting encrypted image data. Decryption may use any algorithm, for instance, public or symmetric key encryption. The step of decrypting may be enabled on condition of receiving an authorising input (e.g. security code).

The second aspect of the invention also provides a computer program or computer program product having instructions which when executed by a computing device or system cause the computing device or system to perform the DD-implementable method as described herein.

The second aspect of the invention also provides a computer readable medium having stored thereon instructions which when executed by a computing device or system cause the computing device or system to perform the DD-implementable method as described herein.

The second aspect of the invention also provides a data stream which is representative of a computer program or computer program product having instructions which when executed by a computing device or system cause the computing device or system to perform the DD-implementable method as described herein.

The computer program or data stream may be available from an "App store" such an iTunes or Google Play.

The second aspect of the invention also provides a computer or apparatus that is a DD (i.e. a type of RNEPD) configured to perform the DD-implementable method described herein. The DD typically comprises a central processing unit, CPU, connected to a memory and one or more I/O interfaces for connection to, for instance, a DD-user-interface module (e.g. keypad), a network card, and a video driver card. The DD may be a stand-alone device for connection to a display such as a TV or projector. The DD may be integrated into another device. The DD may be integrated into a television such as a smart television. The DD may be integrated into a presentation system such as Polycom sound station (star phone). The DD may be integrated into a CD as mentioned above. An example of a DD and software is given in FIGS. 4 to 6.

A third aspect of the invention is a method (known herein as a "PD-implementable method") for implementing on a computing device that is a personal device, PD, which method comprises the steps of receiving via a wireless network packet data stream the live presentation content and displaying it on the PD. The network packet data stream is preferably on generated by the CD as described herein. A PD is a type of RNEPD.

Accordingly, a third aspect of the invention is a PD-implementable method for displaying on a personal device, PD, live presentation content generated for display by a primary processing device (PPD, e.g. laptop), said method comprising the steps:

receiving a wireless network packet data stream corresponding to the live presentation content, processing the network packet data stream received into image data, displaying on the PD, the live presentation content corresponding to the image data.

The receiving, processing steps are similar to those described for the DD-implementable method. The display step is similar to that described for the outputting step of the DD-implementable method.

The PD-implementable method may operate in a "live presentation" mode which refers to operations performed during a live presentation, in particular during multicasting of the live presentation content. The PD-implementable method may operate in an "archive session" mode which refers to operations performed in accessing an archive session and outside of a live session. It is appreciated the PD-implementable method may be configured to perform both methods simultaneously, for instance, allow a user to switch between viewing a live presentation content and a previously archived session.

The PD-implementable method may configure the PD to operate in an "ad hoc mode" during a live presentation session. The PD preferably operates in "ad hoc" mode when the CD operates in "ad hoc" mode. The "ad hoc" mode as mentioned elsewhere provides instant usage of the CD-implemented method, for instance, streaming and capturing of personal KEMs (personal snapshots). It is an option that the PD operates in an "IDC mode" (identification code mode). The PD preferably operates in IDC mode when the CD operates in IDC mode. In IDC mode, personal KEMs (personal snapshots) captured locally on the PD are tagged with the session ID code. Further, in IDC mode, one of the PDs may act as a central note taker, which PD can interact with the CD for retrieval and storage of KEMs of the live-presentation session archive. In the IDC mode a session ID code is generated by the CD that can be referred to for later retrieval of archived presentation sessions. The ad hoc and IDC modes are preferably available when the PD-implementable method is in live presentation mode. These modes are described in more detail below.

In ad hoc mode and during the live presentation, the user can take one or more personal KEMs (personal snapshots) of the live presentation content displayed on the PD, they are stored on the PD, the stored personal KEMs (personal snapshots) can be saved locally (with a user-session name), optionally browsed through, optionally user notes added thereto, and optionally synchronised with a note taking service such as Evernote or Microsoft One Note.

The PD-implementable method allows the PD to capture and store at least one personal KEM that is an image frame of the live presentation content—these KEMs are known as "personal KEMs" or "personal snapshots" and are not shared with the CD or other RNEPDs. The personal KEMs may be stored in a PD-cache for later deletion after the session, or archived in a PD-archive for later retrieval on a storage medium connected to the PD. The CD-implementable method may allow association of a user-session name to each KEM. The storage medium connected to the PD maybe within the PD itself, it may be a networked storage medium, it may be a removable storage medium.

Accordingly, the PD-implementable method may further comprise the step of receiving an input of a "capture" command to capture and store on the PD a personal KEM (personal snapshot) of the displayed live presentation session. The "capture" command may be provided by a user, for instance, it may be received via an input device on the PD (e.g. touchscreen).

The PD-implementable method may further comprise the step of receiving an input of a "select" command to selectively retrieve one of the PD-stored personal KEMs. The select command may by an instruction to select forward or backwards through the stored personal KEMs one personal KEM at a time. The "select" command may be provided by a user, for instance, it may be received via an input device on the PD (e.g. touchscreen).

The PD-implementable method may further comprise the step of displaying on the PD one of the PD-stored personal KEMs (personal snapshots) in place of the live presentation session. After an image frame is captured by the capture command, for instance, the PD may display the captured image frame in place of the live presentation session. After an instruction of a select command is received, the PD may display the PD-stored personal KEM in place of the presentation session. Hence, the PD may be configured to display one of the PD-stored personal KEMs in place of the presentation session responsive to the store or select command.

The PD-implementable method may further comprise the step of receiving an input of a "live" command to instruct the PD to revert to displaying the streamed presentation session. The "live" command may be provided by a user, for instance, it may be received via an input device on the PD (e.g. touchscreen).

The PD-implementable method may further comprise the step of receiving an input of a "stop" command to stop streaming the live presentation content.

In ad hoc mode, the PD-implementable method may also allow the PD to act as a user interface to allow personal notes (text and/or annotations) to be added to one or more of the PD-stored image frames (personal KEMs) during the presentation session. The PD-implementable method allows the personal notes to be taken live, during the live presentation session. The personal KEMs (i.e. captured image frame with notes) may be stored in a PD-archive for later retrieval on a storage medium connected to the PD. The personal KEMs are not ordinarily sent back to the CD. The notes may be entered through a PD-user-interface module such as a touch screen.

Accordingly, the PD-implementable method may further comprise the steps of providing functionality on the PD to:
- select and display a PD-stored personal KEM of the live presentation session,
- receive and add personal user notes to the selected personal KEM,
- archiving the personal KEM with added personal user notes in the PD-presentation session archive.

The PD-implementable method may further provide a functionality on the PD to synchronise a PD-presentation session archive with a cloud-based note-management service, such as Evernote or Microsoft One Note. Accordingly, the PD-implementable method may further comprising the steps providing the functionality on the PD to synchronise a PD-presentation session archive with a cloud storage service.

As with the ad hoc mode, in the IDC mode and during the live presentation, the user can take one or more personal KEMs (personal snapshots) of the live presentation content displayed on the OD, they are stored on the PD, the stored personal KEMs (personal snapshots) can be saved locally (with a user-session name), optionally browsed through, optionally user notes added thereto, and optionally synchronised with a note taking service such as Evernote or Microsoft One Note. A primary difference over the ad hoc mode is that the personal KEMs may be tagged with the session ID code generated by the CD. Accordingly, the same features of the PD-implementable method described herein in relation to the ad hoc mode, are also applicable to the PD-implementable method in IDC mode, with the addition that each KEM may be tagged with the session ID code generated by the CD. The PD-implementable method thus includes a step of receiving a session ID code from the CD. The session ID code generated by the CD may be made available to the PD-implemented method in IDC mode through a web-server protocol. The PD may communicate with the CD to perform commands such as "capture", select", "stop" and for accessing the CD presentation session archive across a network connection with the CD. Preferably, the network connection is wireless. The network connection is separate from the network stream of the live presentation content.

A further distinction between ad hoc mode and IDC mode is that in IDC mode one of the PDs may be assigned as a central note taker (CNT) taking official notes, in other words, the CD-implementable method further allows the PD to be assigned as the PD-CNT as described above. The PD-implementable method allows the official notes to be taken live, during the streamed presentation session. In practice, a PD-CNT may operated by a secretary taking official notes of a meeting. A PD-CNT is configured to access the CD-archive during a presentation session, selectively retrieve a KEM therein, display on the PD-CNT the retrieved KEM, receive user inputted notes (e.g. text and/or annotations) thereto, and to save the KEM updated with official notes in the CD-archive. It is an aspect that the KEMs updated with official notes cannot be changed. There is generally only one PD out of all the RNEPDs assigned as PD-CNT during a presentation session. The interaction with a PD-CNT may be only available in "IDC mode". The notes may be entered through a PD-user-interface module such as a touch screen. The session ID code generated by the CD may be made available to the PD-implemented method in IDC mode through a web-server protocol. The CD-implementable method may use a web-server protocol to interact with the PD-CNT.

Accordingly, the PD-implementable method further comprises the steps of, during a live presentation session in "IDC mode":
- assigning the PD as a PD-CNT,
- sending a "select" command to the CD to selectively retrieve one of the CD archived KEMs associated with the session ID code of the live presentation session
- receiving the selected KEM, and
- sending to the CD an updated KEM further comprising user (official) notes.

The updated KEM is associated with session ID code of the presentation session in the CD-archive.

A PD-CNT may also be able to capture a KEM of a live presentation content displayed by the PD and send it to the CD for storage on a storage medium connected to the CD. Such a captured CD is also known as a shared KEM as mentioned above. Input of a "capture" command may instruct the PD to send for archive storage on the CD a PD-captured KEM of the live presentation content outputted by the PD. The PD-captured KEM may be associated with the session ID code generated by the CD, prior to sending to the CD. Accordingly, the PD-implementable method may further comprise the step of receiving an input of a "capture"

command and sending the PD-captured KEM of the live presentation content to the CD.

The PD-implementable method may operate in an archive mode. The PD-implementable method may also allow the PD to retrieve a PD-presentation session archive responsive to a (user) input of a user session name, or session ID code. The retrieved KEMs may be viewed, personal notes may be added thereto, and the KEMs updated with the notes may be stored on a storage medium connected to the PD. The retrieval of the archived KEM is typically performed outside of a live presentation session. The notes may be entered through a PD-user-interface module such as a touch screen.

Accordingly, the PD-implementable method may further comprise the steps of providing the functionality on the PD to:
- select and retrieve a PD-presentation session archive responsive to a (user) input (of a user session name or session ID code),
- select and display KEM of the retrieved PD-presentation session archive,
- receive and add personal notes to the KEM, and
- store the KEM updated with the personal notes in the PD-presentation session archive (associated with the user session name or session ID code).

The PD-implementable method may further provide a functionality on the PD to synchronise a PD-presentation session archive with a cloud-based note-management service, such as Evernote or Microsoft One Note. Accordingly, the PD-implementable method may further comprising the steps providing the functionality on the PD to synchronise a PD-presentation session archive with a cloud storage service.

The PD-implementable method may also allow the PD to retrieve one or more KEMs from the CD-presentation session archive responsive to a (user) input of a session ID code. The retrieved KEM may be viewed, personal notes may be added thereto, and the KEM updated with the notes may be stored on a storage medium connected to the PD. The retrieval of the archived KEM is typically performed outside of a live presentation session. The notes may be entered through a PD-user-interface module such as a touch screen. The PD-implementable method may use a web-server protocol to interact with the CD.

Accordingly, the PD-implementable method may further comprise the steps of providing the functionality on the PD to:
- send a (user) input of a session ID code of a presentation session archive to the CD
- send a "select" command to the CD to selectively retrieve one or more of the CD-archived KEMs associated with the session ID code of the presentation session archive
- receive and display the selected KEM,
- optionally receive and add personal notes to the selected KEM,
- store the KEM updated with personal notes associated notes in the PD-presentation session archive on a storage medium connected to the PD.

The PD-implementable method may further provide a functionality on the PD to synchronise a PD-presentation session archive with a cloud-based note-management service, such as Evernote or Microsoft One Note. Accordingly, the PD-implementable method may further comprising the steps providing the functionality on the PD to synchronise a PD-presentation session archive with a cloud storage service.

As mentioned above, CD-implementable method may provide a difference in visibility of the live stream on the network—a public mode or a secure mode. When in public mode, any RNEPD with appropriate software can view the presentation session. When security is activated the CD-implementable method may utilise a (e.g. 4-digit) security code. The security code is preferably auto-generated. The CD-implementable method may display the security code on its CD-user interface module. People outside the room can then not view the live stream. People inside the room can view the live stream on their PD provided they know the security code (shared by the presenter), which security code enables the PD.

The PD-implementable method may further comprise the step of enabling the PD to display the live presentation session restricted to a group of enabled RNEPDs. The PD-implementable method may recognise a security tag in the network packet data stream that sets an enabled state for a presentation session having a particular session ID code, and the method processes the network packet data stream. Where the security tag is not recognised, a non-enabled state is set and the PD-implementable method does not process the network packet data stream. The security tag is preferably generated and introduced into the network packet data stream by the CD, and streamed by the CD.

Accordingly, the PD-implementable method may further comprise the steps of:
- extracting a security tag present in the network packet data stream,
- setting an enabled state (of the PD) when the security tag is recognised, wherein processing of the network packet data stream is permitted, and
- setting a non-enabled state (of the PD) when the security tag is not recognised, wherein processing of the network packet data stream is prohibited.

The step of recognising the security tag may include:
- receiving an input of a security code,
- comparing the security code with the security tag, and
- determining from the comparing a recognition of the security tag.

The security tag is determined as a recognised when pre-defined criteria are fulfilled during the comparing. The security code may be provided by a user, for instance, it may be received via an input device on the PD (e.g. touchscreen).

The PD-implementable method may further comprise the step of decrypting encrypted image data. Decryption may use any algorithm, for instance, public or symmetric key encryption. The step of decrypting may be enabled on condition of receiving an authorising input (e.g. security code).

The third aspect of the invention also provides a computer program or computer program product having instructions which when executed by a computing device or system cause the computing device or system to perform the PD-implementable method as described herein.

The third aspect of the invention also provides a computer readable medium having stored thereon instructions which when executed by a computing device or system cause the computing device or system to perform the PD-implementable method as described herein.

The third aspect of the invention also provides a data stream which is representative of a computer program or computer program product having instructions which when executed by a computing device or system cause the computing device or system to perform the PD-implementable method as described herein.

The computer program or data stream may be available from an "App store" such an iTunes or Google Play.

The third aspect of the invention also provides a computer or apparatus that is a PD (i.e. a type of RNEPD) configured to perform the PD-implementable method described herein. The PD typically comprises a central processing unit, CPU, connected to a memory and one or more I/O interfaces for connection to, for instance, a PD-user-interface module (e.g. touch screen), a network card, and a video driver card. It is typically autonomous i.e. battery operatable. Typically the PD is a smart phone, a tablet, or a laptop. An example of a PD-implementable method is given in FIG. 7.

A further aspect of the invention is a system for distributing a presentation session comprising a live presentation generated for display by a primary processing device (PPD, e.g. laptop) and one or more captured image frames thereof to one or more recipient network-enabled processing devices (RNEPDs), which system comprises:
  a central device as described herein, and
  a recipient network-enabled processing device (RNEPD) that is a display module (DD) as described herein.

DETAILED DESCRIPTION OF THE FIGURES

FIG. 1 is an example of a CD-implementable method of the invention. The method (100) receives signals (110) outputted by a primary processing device, PPD, (10) that is a laptop, or outputted by a presentation system (20) connected to the PPD. The signals correspond to the live presentation images. The method processes (120) the signals to encode (e.g. compress) the images, and to convert them into a network data packet stream for distribution (e.g. by multicasting or unicasting). Subsequently method outputs the packets for wireless transmission via a wireless router (132) present in the CD, or an external router (30) for wireless transmission.

In session ID code mode ("IDC mode +DD"), the method also creates a session ID code (140) for the presentation session, receives from a RNEPD that is a DD a captured key element of the presentation (KEM) (142), and stores said KEM in an CD-archive linked to the session ID code (144).

In an alternative IDC mode ("IDC mode +PD-CNT"), when the CD is communicating with a personal device that is a central note taker (PD-CNT), the method also creates a session ID code (140) for the presentation session. It may receive from a PD-CNT a request for an archived KEM (152) that is part of the live presentation session, and send to the PD-CNT the requested KEM. After the central note taker has added official notes, the CD may receive the KEM together with the official notes (154), and store them in the CD archive (156). The CD in "IDC mode +PD-CNT" may also a receive from a RNEPD that is a PD a captured key element of the presentation (KEM), and store said KEM in an CD-archive linked to the session ID code.

Figure 2:
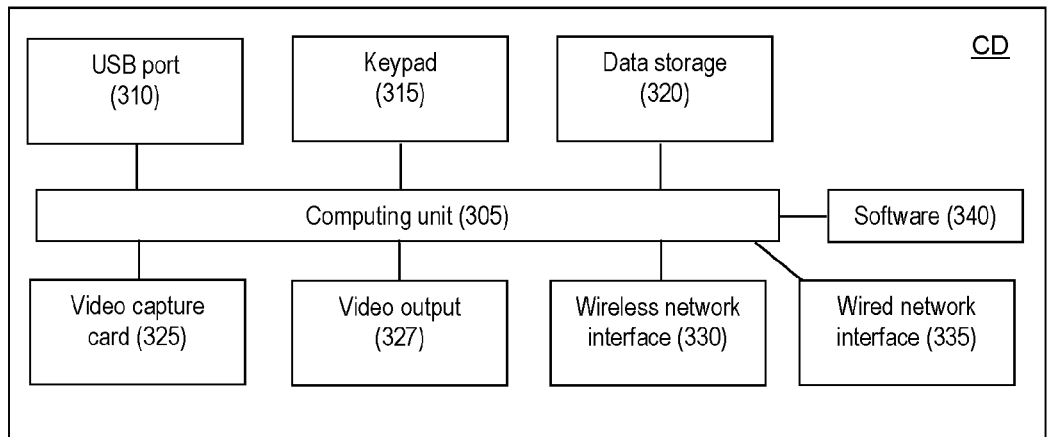
FIG. 2 is an example of a hardware configuration of a CD of the invention.

In an archive session mode ("Arch. Sess. Mode +PD"), when the CD is communicating with a personal device after the live presentation session has finished, the CD may receive a session ID number from the PD (160), and serve the PD (162) with one or more KEMs of the CD-presentation session archives corresponding to the session ID number FIG. 2 is an example of hardware (300) elements that may be present in the CD. CD typically contains a computing unit (305), either Intel/AMD based or using an embedded SoC with for example an ARM processor and some hardware accelerated processing capabilities. A CD-user interface module (keypad) (315) may have a numeric keypad with the digits 0-9. A DELETE key may be provided to undo wrong entries. A ENTER key may be provided to indicate the end of an input sequence, a START Button to begin a session, a STOP button to end a session, a CAPTURE or SNAPSHOT button capture an image frame of the presentation stream. A USB hub (310) may be used for future system extensions. It may be used to connect the CD-user interface module (keypad) (315). A video output (327) is used as loop-through capability from the video input to a display optionally connected to the CD. Optionally, the CD can inject additional overlay information like making the "Security Passcode" also visible on a bigger display. A video capture card (325) offers the possibility to make a video signal available to the computing unit (305) of the CD for further processing. Example implementations are a video capture card connected to the PCIe interface, a video capture device connected to the USB port, or an HDMI to CSI/MIPI converter that makes the video signal accessible to a camera interface, which could be more interesting for embedded hardware implementations. A data storage (320) holds the software for the CD, as well as the configuration data, the cached and optionally archived image frames. A wired network interface (335) can be used to connect the CD to an external wireless infrastructure, to administer the system over network cable, or to bridge devices connected to the access point (240) to an intranet or internet. A wireless network interface (330) allows the CD also act as wireless access point. Software (340) contains instructions for executing the CD-implementable method as described herein for the CD, and is also stored in the data storage (320).

Figure 3:
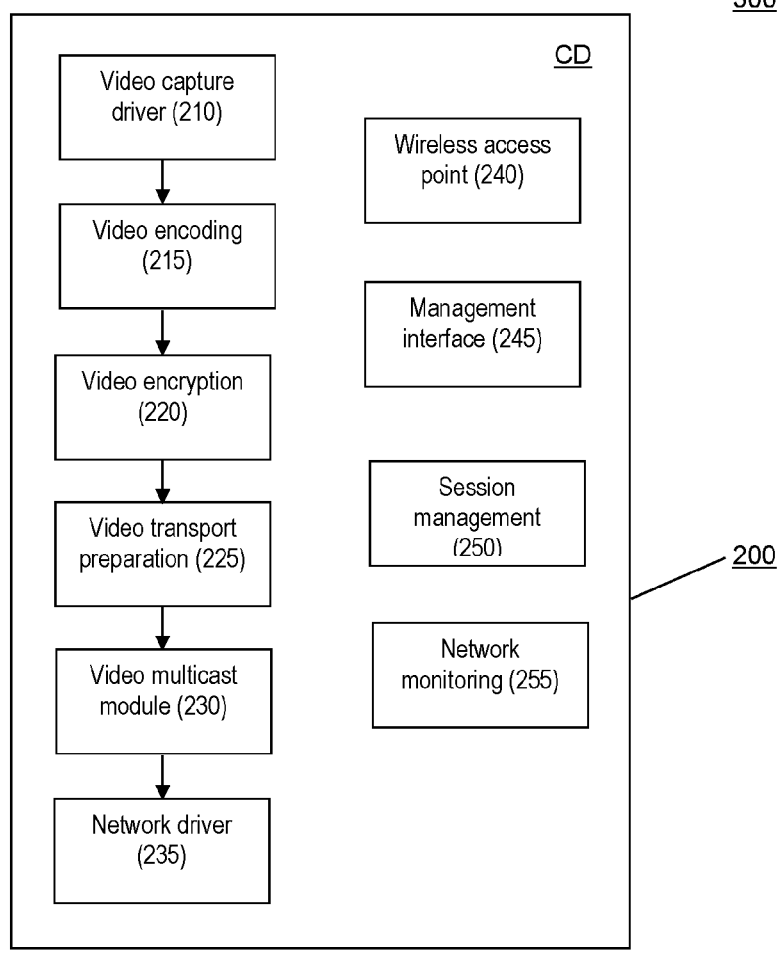
FIG. 3 is an example of a software configuration of a CD of the invention.

FIG. 3 is an example of software (200) blocks that may be used to implement the CD-implementable method and executed by the CD. A video capture driver (210) drives the capturing of video content from the PPD. It may automatically adapt to the format of the video offered to the video capture card by the presenter device. The video encoding block (215) encodes (and thereby also compresses) the video to a more manageable size. The encoding may be done towards a standard format such H.264, and done in the best way possible to be multi-casted at a later stage over an unreliable packet network. An optional video encryption block (220) may be used in case additional security levels are required over and above the security and encryption already offered by the network. A video transport preparation block (225) prepares the content to be streamed over the unreliable network such as to be as robust as possible to transmission problems. One element in this preparation is the addition of some redundancy such as forward error correction (FEC) packets such that packets can be recovered in case of moderate packet loss. A video streaming module (230) sends the packets over the packet network using multi-cast or unicast mode for instance. A network driver (235) handles the network card(s) built into the CD. A wireless access point (26) provides an access point functionality such that all types of clients can connect wirelessly to the CD. Optionally, the access point can be an external device. An optional management interface (245) provides access to the configuration data of the "Central Node", such that it can be configured and managed using an interface such as HTTP or SNMP. A session management module (250) handles the ongoing system wide sessions, including the pairing, monitoring and management of connected Receivers, deleting locally stored snapshots and storing/uploading/restoring the shared snapshots of sessions. A network monitoring module (255) monitors the network conditions and provides appropriate feedback to the other modules to take appropriate measures: (210)—e.g. capture at lower resolution or lower frame rates, (215)—e.g. encode to lower quality with lower bandwidth requirements, (225)—e.g. group video frames into smaller or larger packets, (240)—e.g. switch to broader, narrower or different channels, (250)—e.g. limit the number or type of additionally allowed receiving devices.

Figure 4:
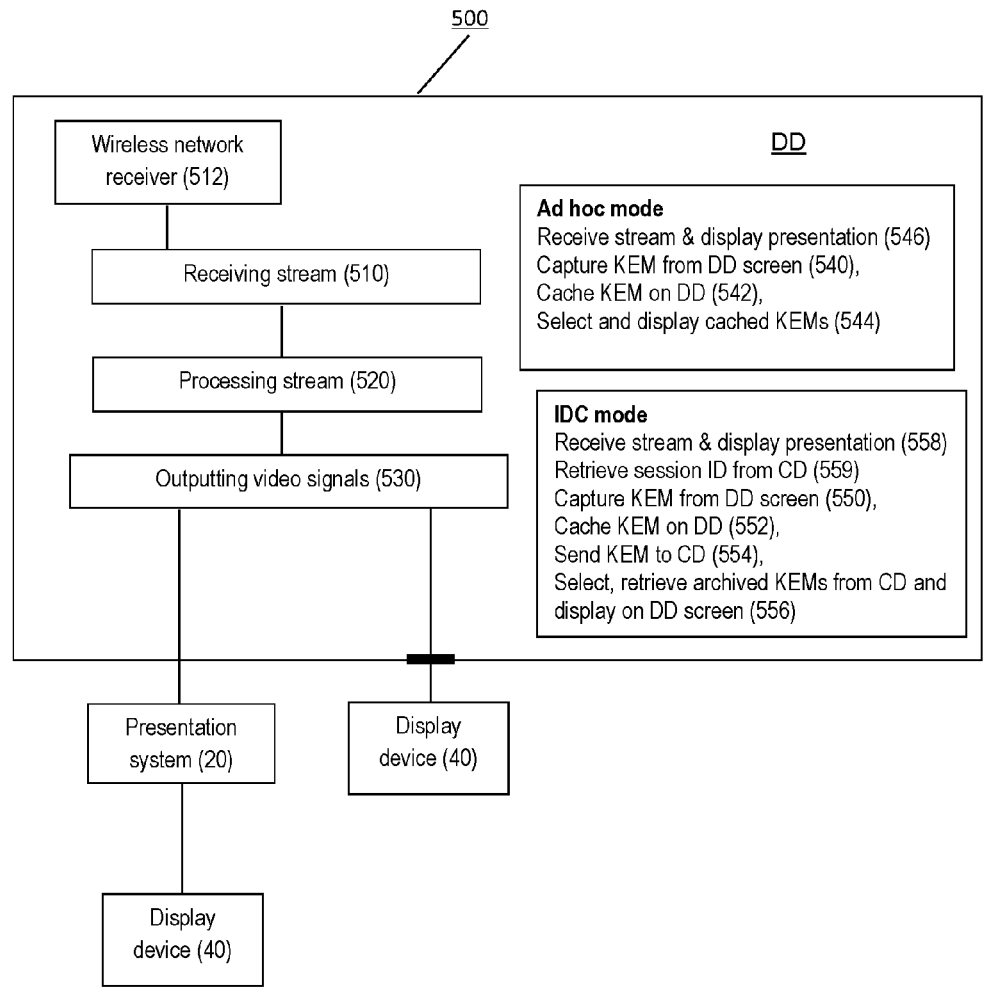
FIG. 4 is an example of a method implementable by a display device, DD, of the invention.

FIG. 4 is an example of a DD-implementable method of the invention. The method (500) receives (510) the streaming of network packet data stream (512) corresponding to the presentation session via the wireless network receiver (512). The method processes (520) the network packet data stream, reassembling the packets and decoding (e.g. decompressing) the image stream. Subsequently method outputs video signals (530) that may be sent to a presentation system, (20) connected to a display (40) or may be sent directly to a display (40). The method also allows the user to capture (540), cache (542) and replay (544) image frames from the presentation session, and output (530) them in place of the live presentation.

In ad hoc mode, the DD receives and displays the stream (546), it may capture a KEM comprises an image frame from its outputted video signals (540) and cache it locally (542). Responsive to a user input, a cached KEM can be selected from the DD-cache and displayed in place of the live presentation (544).

In IDC mode, the DD receives a session ID number from the CD corresponding to the live presentation session. The DD also receives and displays the stream (546), it may capture (with a local "capture" command) a KEM comprising an image frame from its outputted video signals (540) and cache it locally (542). The KEM is also sent to the CD (554) for storage in the CD presentation session archive. The DD may receive a user input to select a KEM from the presentation session archive ("select" command); the CD send an instruction to the CD to send the selected KEM, and the DD subsequently displays the selected KEM on its screen in place of the live presentation (556).

Figure 5:
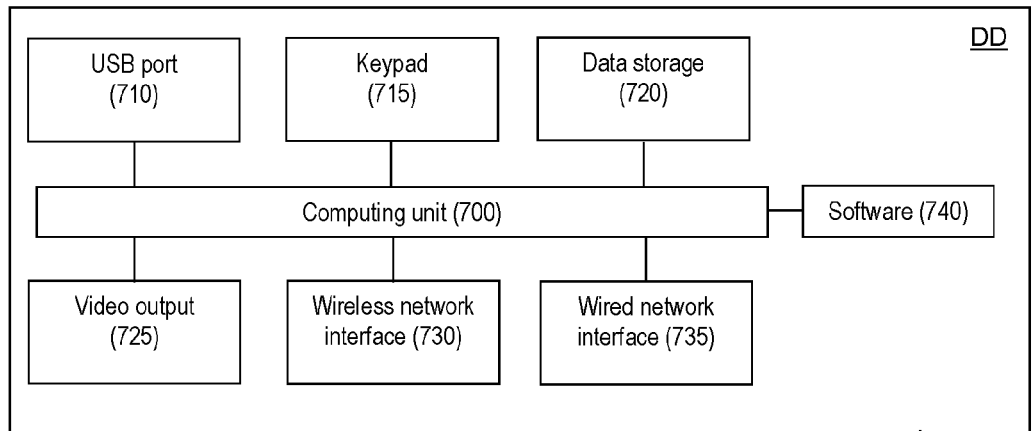
FIG. 5 is an example of a hardware configuration of a DD of the invention.

FIG. 5 is an example of hardware elements (700) that may be present in the DD. The DD receives the stream and handles imaging capturing for typically fixed screens in the meeting room or seminar space. DD typically contains a computing unit (700), either Intel/AMD based or using an embedded SoC with for example an ARM processor and some hardware accelerated processing capabilities. A DD-user interface module (keypad) (715) may have a numeric keypad with a CAPTURE or SNAPSHOT button capture an image frame of the presentation stream. The USB port (710) may be used to power the DD. An appropriate USB port able to deliver enough power is typically available in modern displays, which saves an extra power cable connector during installation and synchronizes power between DD and display. A video output (725) is a path over which the DD is connected to a display or projector. A data storage (720) holds the DD software (740), its configuration data, and DD-cached images. A wired network interface (735) can optionally be used in settings where a wired network is to be preferred over a wireless network. A wireless network interface (730) allows the DD also act as wireless access point. Software (740) contains instructions for executing the DD-implementable method as described herein for the CD, and is also stored in the data storage (720).

Figure 6:
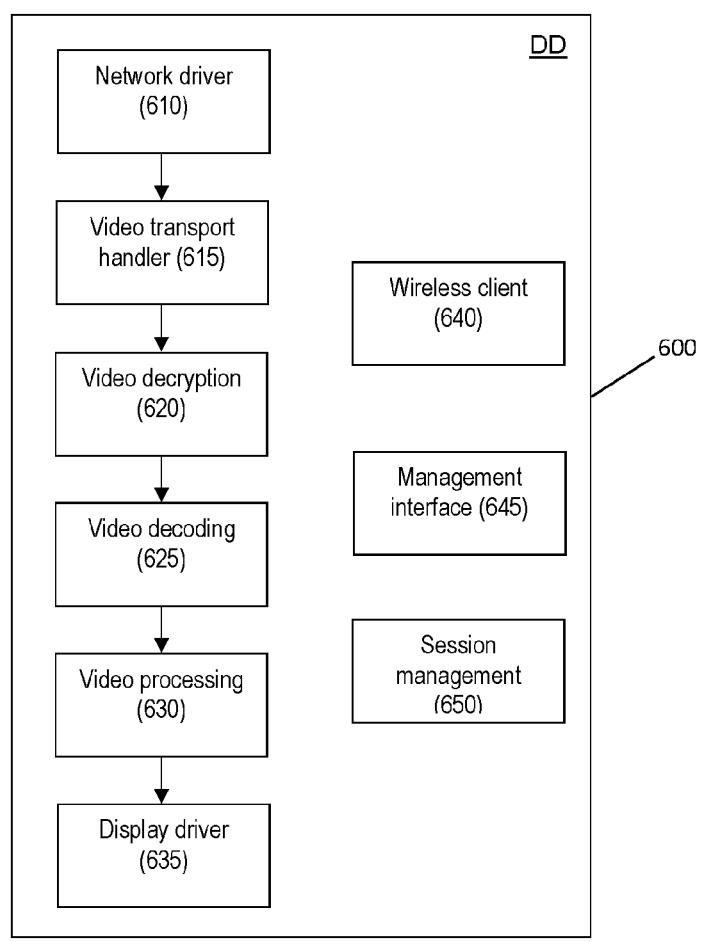
FIG. 6 is an example of a software configuration of a DD of the invention.

FIG. 6 is an example of software blocks (600) that may be used to implement the DD-implementable method and executed by the DD. A network driver (610) receives packets from the network. A video transport handler (615) processes the packets received over the network such as to minimize the effects of transmission errors. This may include a jitter buffer to handle jitter and packet reordering and a FEC handler to recover packets if possible using the redundant FEC packets. An optional video decryption module (620) may decrypt encrypted image data. A video decoding module (625) decodes the encoded video frames. A video processing module (630) handles possibly additional steps such as scaling. A display driver (635) brings the image on the display connected to the DD. A wireless client (640) connects the DD to the CD. A management interface (645) provides access to the configuration data of the DD, such that it can be configured and managed using an interface such as HTTP or SNMP. The session management module (650) handles the session for the DD, including the pairing, deleting locally stored snapshots and storing/uploading/restoring the shared snapshots of sessions for the DD.

Figure 7:
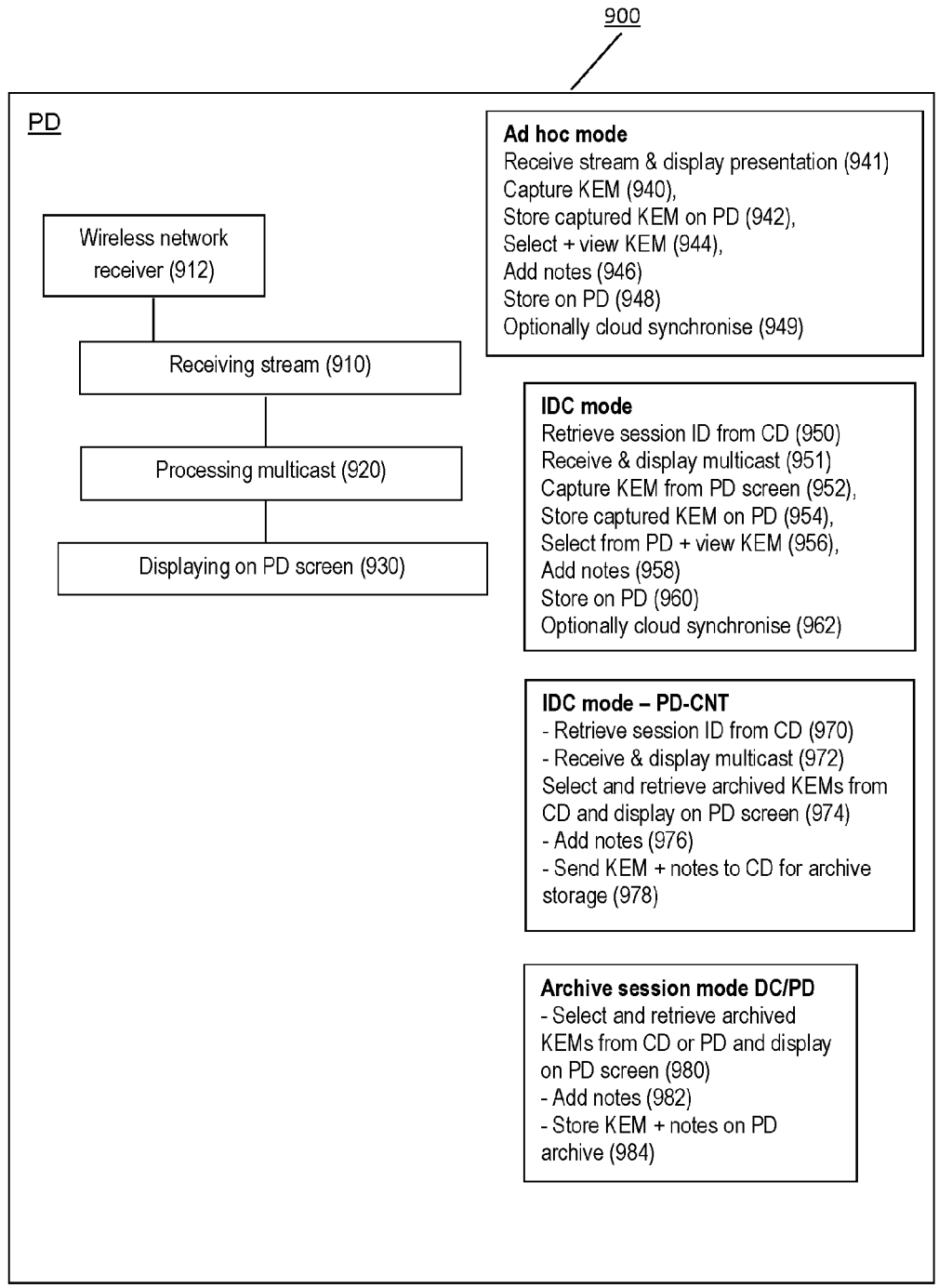
FIG. 7 is an example of a method implementable by a personal device, PD, of the invention.

FIG. 7 is an example of a PD-implementable method of the invention. The method (900) receives (910) the network packet data stream corresponding to the presentation session via the wireless network receiver (912). The method processes (920) the network packet data stream, reassembling the packets and decoding (e.g. decompressing) the image stream. Subsequently, the method instructs the PD to display the image stream corresponding to the presentation session. The method also allows the user to capture (540), cache (542) and replay (544) image frames from the presentation session, and output (530) them in place of the live presentation.

In ad hoc mode, the PD-implementable method also allows the user to receive the stream (941), to capture (940), store (942) on the PD, and select (944) KEMs from storage for display in place of the live presentation. Personal notes (live notes) by the user may be added thereto (946) and stored on a storage medium connected to the PD (948). KEMs may be cloud synchronised (494).

In IDC mode, the PD-implementable method retrieves a session ID from the CD (950). Within that session, the method also allows the user to receive the stream (951), to capture (952) from the PD display, store (954) on the PD, and select (956) KEMs from storage for display in place of the live presentation. Personal notes (live notes) by the user may be added thereto (958) and stored on a storage medium connected to the PD (960). KEMs may be cloud synchronised (962).

In IDC mode, when the PD is designated as a central note taker (PD-CNT), the PD-implementable method retrieves a session ID from the CD (970). Within that session, the method also allows the user to receive the stream (972). The method further allows the user to select and retrieve one or more archived KEMs from the CD in respect the session (974) and display them in place of the live presentation. Official notes (live notes) by the user may be added thereto (976). The KEMs and added notes may be sent to the CD and archived on the storage medium connected to the CD (978).

In archive session mode, the PD-implementable method also allows the user input a session ID number and to retrieve from the CD one or more selected KEM corresponding to the session ID number (980). Notes may be added thereto (982). The KEM and added notes may be stored in as archive on a storage medium connected to the PD (984).

Alternatively, in archive session mode, the PD-implementable method also allows the user input a session ID number or a user session name and to retrieve from the PD one or more selected KEM corresponding to the session ID number or a user session name. Notes may be added thereto. The KEM and added notes may be stored in as archive on a storage medium connected to the PD.

The invention claimed is:

1. A method implementable on a network-enabled recipient processing device, PD, for displaying a live presentation session comprising live presentation content generated for display by a primary processing device, PPD, and one or more captured image frames thereof, the method comprising:

receiving a wireless multicast network packet data stream corresponding to the live presentation content;
processing the received wireless multicast network packet data stream into image data;
displaying, on a display of the PD, live presentation content corresponding to the image data;
receiving input of a capture command to capture and store in storage of the PD a key element of the presentation, KEM, that comprises a captured image frame of the live presentation content;
receiving input of a first select command to selectively retrieve a stored KEM for the presentation session;
outputting for display on the display the selected PD-stored KEM in place of the live presentation content, responsive to the first select command; and
receiving input of a live command to revert to displaying the live presentation content.

2. The method according to claim 1, further comprising:
receiving from a PD user interface module during the live presentation session, personal user notes linked to a KEM of the live presentation session; and
storing on the storage medium, KEM updated with the personal user notes.

3. The method according to claim 2, wherein the wireless multicast network packet data stream corresponding to the live presentation is generated by a central device, CD, executing a method comprising:
receiving signals corresponding to the live presentation content generated for display by the PPD;
processing the received signals into the wireless multicast network packet data stream;
outputting the wireless multicast network packet data stream for distribution to one or more PDs;
generating a session ID code for the live presentation session;
generating a CD-presentation session archive linked to the session ID code for the live presentation session on a storage medium connected to the CD;
receiving from a PD a KEM that comprises a captured image frame of the live presentation content;
associating the KEM with the session ID code;
storing the KEM and associated session ID code in the CD-presentation session archive.

4. The method according to claim 3, further comprising:
assigning the PD as a central note taker, PD-CNT;
receiving the session ID code from the CD;
receiving input of a second select command from a PD user interface module during the live presentation session, and sending an instruction to the CD to select one of the KEMs stored in the CD-presentation session archive of the live presentation session associated with the session ID code;
receiving, from the CD, the selected KEM;
outputting for display the selected KEM received from the CD in place of the live presentation responsive to the second select command; and
receiving an input of official notes linked to KEM from a PD user interface module and outputting to the CD, the KEM updated with official notes.

5. The method according to 3, further comprising:
receiving from a PD user interface module, a session ID code of a prior presentation session stored in a CD-presentation session archive on the storage medium connected to the CD;
receiving, from the CD, one or more KEMs from the presentation session archive associated with the inputted session ID code;
outputting for display by the PD the received one or more KEMs; and
based on receiving from the PD user interface module input of personal notes linked to the KEM, storing, in the storage of the PD, the KEM and associated personal notes.

6. The method according to claim 3, further comprising:
receiving, from a PD user interface module, input of a session ID code or a user session name of a prior presentation session stored in a PD-presentation session archive in the storage of the PD;
retrieving, from the PD, one or more KEMs from the presentation session archive associated with the inputted session ID code or user session name;
outputting for display by the PD the one or more retrieved KEMs; and
based on receiving from the PD user interface module input of personal notes linked to the KEM, storing on the storage of the PD the KEM and associated personal notes.

7. The method according to claim 1, further comprising synchronising one or more stored KEMs with a cloud-based notes management service.

8. The method according to claim 1, wherein the PD and the CD are in the same room.

9. A non-transitory computer-readable medium storing instructions, which when executed by a computer of a network-enabled recipient processing device, cause the computer to:
control receiving of a wireless multicast network packet data stream corresponding to the live presentation content;
process the wireless multicast network packet data stream received into image data;
control display, on a display of the recipient processing device, of live presentation content corresponding to the image data;
control receiving of input of a capture command to capture and store in storage of the recipient processing device a key element of the presentation, KEM, that comprises a captured image frame of the live presentation content;
control receiving of input of a select command to selectively retrieve one of the stored KEMs of the presentation session;
control output for display the selected stored KEMs in place of the live presentation content responsive to the first select command; and
receiving input of a live command to revert to displaying the live presentation content.

10. A method implementable on a computer that is a central device, CD, for distributing in a live presentation session, live presentation content generated for display by a primary processing device, PPD, to one or more recipient network-enabled processing devices, PDs, the method comprising:
receiving signals corresponding to the live presentation content generated for display by the PPD;

processing the received signals into a network packet data stream including a wireless multicast network packet data stream;

outputting the network packet data stream for distribution to the one or more PDs;

generating a session ID code for the live presentation session;

generating a CD-presentation session archive linked to the session ID code for the live presentation session on a storage medium connected to the CD;

receiving, from a PD, a key element of the presentation, KEM, that comprises a captured image frame of the live presentation content;

associating the KEM with the session ID code;

storing the KEM and associated session ID code in the CD-presentation session archive.

11. The method according to claim 10, further comprising:

receiving, from a PD, during the live presentation session, input of a select command to select one of the KEMs stored in the CD-presentation session archive; and outputting to the PD the selected KEM.

12. The method according to claim 10, further comprising:

assigning one of the PDs as a central note taker, PD-CNT;

receiving, from the PD-CNT during the live presentation session, input of a select command to select one of the KEMs stored in the CD-presentation session archive;

outputting to the PD-CNT the selected KEM;

receiving, from the PD-CNT, the KEM updated with official notes; and storing the updated KEM in the CD-presentation session archive.

13. The method according to claim 10, further comprising:

receiving, from a PD, input of a session ID code of a prior presentation session;

retrieving a presentation session archive from the storage medium connected to the CD associated with the inputted session ID code;

receiving a select command from the PD to selectively retrieve one or more of the KEMs in the presentation session archive; and outputting to the PD the retrieved one or more KEMs.

14. The method according to claim 10, wherein the CD and PD are in the same room.

15. An apparatus comprising processing circuitry configured to:

control receiving signals corresponding to live presentation content generated for display by a primary processing device, PPD;

process the received signals into a network packet data stream including a wireless multicast network packet data stream;

control output of the network packet data stream for distribution to one or more recipient processing devices, PDs;

generate a session ID code for a live presentation session for the live presentation content;

generate a central device, CD, presentation session archive linked to the session ID code for the live presentation session on a storage medium connected to the CD;

control receiving, from a PD, of a key element of the presentation, KEM, that comprises a captured image frame of the live presentation content;

control associating of the KEM with the session ID code;

control storing of the KEM and associated session ID code in the presentation session archive.

16. A method implementable on a recipient network-enabled processing device comprising a display, DD, for displaying in a live presentation session, live presentation content generated for display by a primary processing device, PPD, the method comprising:

receiving a network packet data stream corresponding to the live presentation content;

processing the network packet data stream received into image data;

outputting signals corresponding to the image data for rendering of the live presentation content on the display;

receiving input of a capture command to capture and cache on the DD a key element of the presentation, KEM, that comprises a captured image frame of the displayed live presentation content;

receiving input of a select command to selectively retrieve one of the DD-cached KEMs;

outputting for display one of the DD-cached KEMs in place of the live presentation content responsive to the capture or select command; and receiving input of a live command to revert to outputting the live presentation content.

17. The method according to claim 16, further comprising:

receiving a session ID code from a central device, CD;

upon receiving the capture command further outputting to the CD the DD-cached KEM associated with the session ID code;

upon receiving the input of the select command, sending an instruction to the CD to select one of the KEMs stored in the CD-presentation session archive of the live presentation session associated with the session ID code;

receiving from the CD the selected KEM; and outputting for display, not one of the DD-cached KEMs, but the selected KEM received from the CD in place of the live presentation content responsive to the capture or select command.

18. A display device (DD) comprising processing circuitry configured to:

receive a network packet data stream corresponding to the live presentation content;

process the network packet data stream received into image data;

output signals corresponding to the image data for rendering of the live presentation content on an image renderer;

receive input of a capture command to capture and cache on the DD a key element of the presentation, KEM, that comprises a captured image frame of the displayed live presentation content;

receive input of a select command to selectively retrieve one of the DD-cached KEMs;

output for display one of the DD-cached KEMs in place of the live presentation content responsive to the capture or select command; and receive input of a live command to revert to outputting the live presentation content.

* * * * *